United States Patent
Gatherer et al.

(10) Patent No.: US 6,400,769 B1
(45) Date of Patent: Jun. 4, 2002

(54) CENTRAL OFFICE LINECARD AND METHOD FOR MAPPING COMPANDED DATA FORMATS

(75) Inventors: Alan Gatherer, Richardson; Keith L. Quiring, Dallas; Murtaza Ali, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/129,070

(22) Filed: Aug. 4, 1998

(51) Int. Cl.[7] .............................. H03B 3/00; H03B 3/02; H03B 13/00
(52) U.S. Cl. ........................................ 375/241; 375/220
(58) Field of Search ................................... 375/241, 242, 375/222, 220, 286, 288; 370/352, 353, 466, 464, 252

(56) References Cited

U.S. PATENT DOCUMENTS 5,742,596 A * 4/1998 Baratz et al. ............... 370/356
6,173,015 B1 * 1/2000 Eyuboglu et al. ........... 375/286
6,181,694 B1 * 1/2001 Pickett ....................... 370/353

* cited by examiner

Primary Examiner—Chi Pham
Assistant Examiner—Dung X. Nguyen
(74) Attorney, Agent, or Firm—J. Dennis Moore; W. James Brady, III; Frederick J. Telecky, Jr.

(57) ABSTRACT

A linecard codec (250) eliminates limitations of companded code disclosed which increases data rates over a public switched telephone network. The network links a plurality of subscribers and services providers through a central office facility (25) which includes at least one digital backplane (150). The codec (250) comprises an analog interface (152) to the network and a converter (258) coupled to the analog interface and configured to convert analog signals from subscribers to linear coded data (259). A RAM table (262) is used to map the linear coded data (259) to a predetermined coding scheme based on the values stored in the RAM table (262). The RAM table (262) stores mapping values that determine a mapping function between data transmitted by a service provider on the digital backplane (150) and data transmitted to a subscriber.

24 Claims, 3 Drawing Sheets

CENTRAL OFFICE LINECARD AND METHOD FOR MAPPING COMPANDED DATA FORMATS

This application claims priority under 35 USC §119(e)(1) of provisional application Ser. No. 60/071,993 filed Jan. 20, 1998, and is related to application Ser. No. 09/103,496 filed Jun. 23, 1998, entitled "Central Office Line Card with Code Recognition for Increasing Data Rates Over PSTN" and application Ser. No. 09/107,065 filed Jun. 29, 1998 entitled "Methods and Linecard Device for Allocating Multiple Timeslots Over Digital Backplane" the entirety of which are incorporated herein by reference.

TECHNICAL FIELD

The invention relates generally to data communications and more particularly to high speed data transmissions over the public switched telephone network.

BACKGROUND OF THE INVENTION

The sudden popularity of the Internet as a communication tool has led to an intense push for higher data transmission rates over the Public Switched Telephone Network (PSTN). As a result, the demand for increased data transmission rates over analog twisted pair is at an all time high. The most recent widespread standard is "56K" analog modem technology developed by U.S. Robotics and Rockwell/Lucent. While these technologies will not generate true 56 kbps performance under typical subscriber line conditions, they do provide a boost in performance from the previous standard of bidirectional 33.6 kbps.

Theoretically, a connection of 64 kbps should be attainable between the subscriber and the Internet Service Provider (ISP) via a standard Plain Old Telephone Service (POTS) connection. This is because 64 kbps is the rate at which data is transferred from the Central Office (CO) linecard to the ISP or other remote terminal. Several factors prevent this from happening including imperfect line conditions and varying local loop lengths common to POTS analog networks. The primary reason, however, for this less than the theoretical transmission rate is that the PSTN was designed to carry voiceband frequencies in the range of 300–3.4 kHz.

With the advent of digital voice systems, the decision was made to use a "companded" (compressed/expanded) data to reduce the number of bits per digital sample from a nominal 13-bits to a companded 8-bits. Companding schemes use higher resolution at low signal amplitudes and lower resolution at high amplitudes. Companded signals are suitable for voice frequencies but not for analog modems since they limit their apparent bandwidth to a ceiling of 33.6 kbps upstream and 56 kbps downstream. Thus, companded code is a poor carrier for data signals.

Moreover, while the use of 56K standards results in downstream data throughput of 56 kbps under ideal local loop conditions, the upstream direction must still contend with an A/D conversion into 8-bit companded data and is still limited to 33.6 kbps. Imperfect conditions in the analog local loop further degrade the signal resulting in less than the 56/33.6 kbps maximums. If higher data throughput is to be achieved, the limitations in the CO need to be overcome. Overhauling the PSTN by replacing the 8-bit companded data scheme could solve the problem, but this is not a feasible solution since the cost of such as effort would be enormous.

SUMMARY OF THE INVENTION

The invention overcomes limitations in bandwidth of prior communications standards including 56K by offering increased downstream rates using an analog modem communicating over the PSTN.

Disclosed in one embodiment, is a linecard codec for communicating data over a Public Switched Telephone Network (PSTN). Subscribers and services providers communicate through a central office facility. The service providers are coupled to the central office via a digital backplane. The codec comprises an analog interface to the PSTN with a signal converter coupled to the analog interface and configured to convert analog signals from subscribers to equivalent digital linear data. A mapping means is coupled to the converter and arranged to transform linear data to any other mapping scheme for transmission on the backplane. Transmission occurs through a digital interface coupling the codec to the digital backplane.

In one embodiment, the mapping means comprises a RAM table that stores mapping values. The mapping values determine the coding scheme between the data transmitted by a service provider on the digital backplane and the linear code transmitted to a subscriber. In this manner the limitations of companded code are overcome.

According to another embodiment, the linecard incorporates an output register that receives the output of the RAM table and converts it to PCM output signals which are transmitted on the digital backplane to the service provider.

According to another embodiment, the RAM table is configured to store mapping values transferred to the codec directly from the service provider. In the absence of a specific data map, the linecard defaults to linear mapping.

Also disclosed is a communications network wherein the data rate is proportional to a predetermined mapping function provided by a central office facility. The network comprises at least one subscriber having an analog interface to a PSTN, the subscriber capable of generating analog signal waveforms for transmission on the PSTN via the analog interface. A link forms a communications channel between a central office facility and the subscriber. At least one service provider communicates is coupled to the central office facility through a digital backplane. The central office includes a linecard codec configured to receive analog signals from the subscriber and transforms them to equivalent digital bit stream sequences. A mapping function in the linecard codec is provided to adjust the transmission rate of the sequences to be proportional to a predetermined companded scheme stored in the codec.

A technical advantage of the invention is that it provides the subscriber with much more bandwidth than is currently available since it overcomes the limitations of companded data. Thus, the full bandwidth of the digital backplane can be used increasing the overall data rate of the communications network.

Yet another technical advantage of the invention is that it permits replacement of the existing linecard in the CO with the linecard of the present invention enabling hardware and software changes at the CO to provide the increased bandwidth. This eliminates the need to employ a direct customer interface with the CO and thus no equipment needs to be installed at the subscriber's residence.

BRIEF DESCRIPTION OF THE DRAWINGS

Other aspects of the invention including specific implementations are understood by reference to the following detailed description taken in conjunction with the appended drawings in which.

References in the figures correspond to like numerals in the detailed description unless otherwise indicated.

DETAILED DESCRIPTION OF PREFERRED EMBODIMENTS

Figure 1:
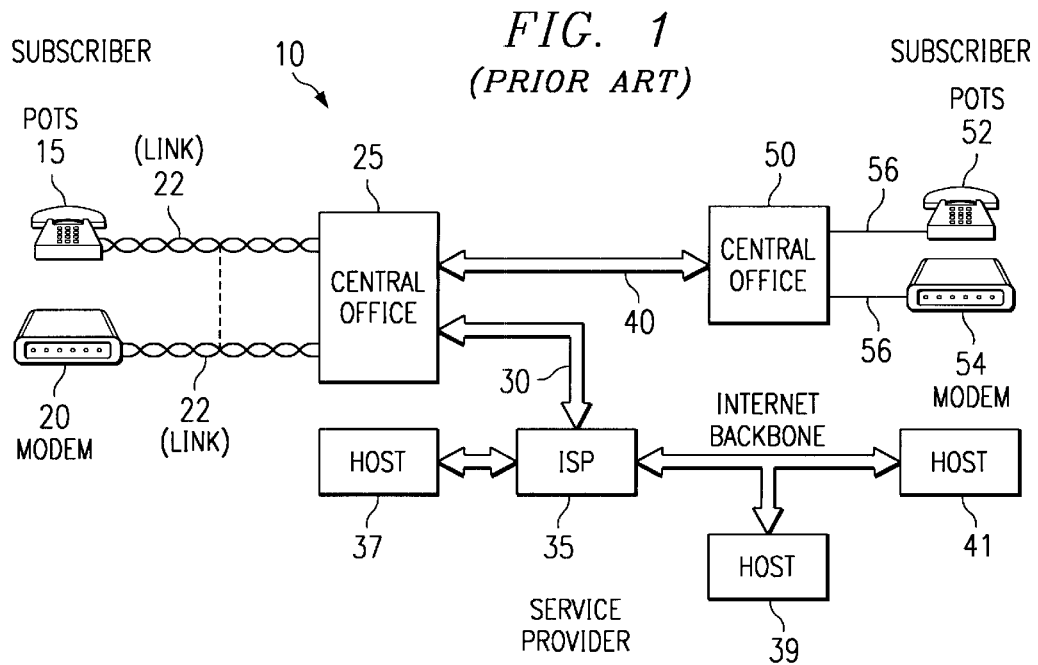
FIG. 1 is a diagram illustrating a communications system wherein the invention can be practiced.

Referring first to FIG. 1, therein is illustrated an example of a communications system 10 in which the invention can be practiced according to one embodiment. The communications system 10 includes subscribers and service providers communicating with each other using telecommunications facilities such as those found in the Public Switch Telephone System (PSTN). Typically an individual subscriber has the transmission/reception and data processing equipment enabling access to a service provider.

As shown, a Plain Old Telephone System (POTS) 15 and a modem 20 are coupled to a central office 25 via link 22. Often the link 22 comprises twisted pair wiring of the type used in many PSTN installations. The link 22 may be shared by both the POTS 15 and modem 20 to gain access to the central office 25. This shared configuration is indicated by the dashed line. In other embodiments, the modem 20 and POTS 15 use separate connections to the central office 25.

In operation, the modem 20 transmits and receives analog signals over the communications link 22 to and from the central office 25. The modem 20 is configured to transmit data across the link 22 to other subscribers and to service providers on the communications system 10. The modem 20 also functions as a reception device for receiving information from other subscribers and service providers.

Typically, the modem 20 connects with a the central office linecard (not shown in FIG. 1) in the central office 25. The transmit and receive functions of the modem 20 and the central office 25 can be implemented using known methods and devices. For example, the communications protocol between the modem 20 and the central office 25 may include those supported and standardized by the International Standard Organization, the International Telephone and Telegraph Consultative Committee and the Electronics Industry Association among others.

The POTS 15 is a standard telephone set used by a subscriber in their home, business or other location. Typically, the subscriber can use both the POTS 15 and the modem 20 for both voice and data communications on link 22. A service provider such as Internet Service Provider (ISP) 35 may be accessed by a large number of subscribers of the communications system 10. A dedicated digital connection 30 may be employed between the central office 25 and the ISP 35. Likewise, a communications link 40 is used to couple the near end central office 25 to a far end central office 50 in the system 10. As with link 30, the communications link 40 between the central offices 25 and 50 is usually a high speed digital connection providing bi-directional communications functions between the central offices 25, 50.

As shown, a plurality of host servers 37, 39 and 41 are coupled to the ISP 35 and provide all the information and services available on the communication system 10. The ISP 35 acts as a gateway to the host servers 37, 39, 41 from any one of the subscribers who have access to the ISP 35. Similarly, the central office 25 provides the routing mechanism from an individual subscriber through their modem 20 and on to a service provider 35. The far end central office 50 provides similar functionality for far end subscribers. Thus, the POTS 52 and modem 54 can be used on the far end of the communications system 10 to gain access to a service provider such as ISP 35.

The invention has particular application with respect to the communications data rate between the central offices 25, 50 and service providers on the communications system 10 such as ISP 35. In particular, the invention is directed at an improved linecard codec utilizing a mapping means which can be implemented in a Random Access Memory ("RAM") table that stores mapping values for converting from companded data schemes to uncompanded data formats. The use of a RAM table in the linecard codec permits the limitations of companded data formats to be overcome.

Figure 2:
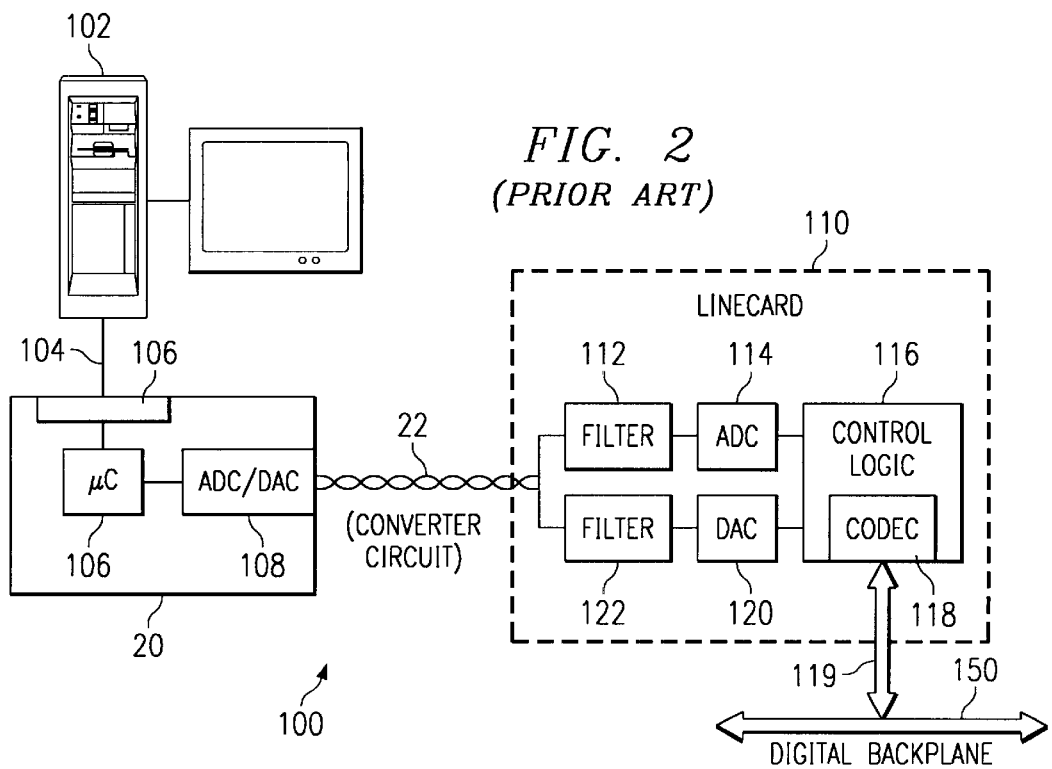
FIG. 2 is a block diagram of subscriber modem coupled to a central office linecard.

A better understanding of the functions of a linecard is obtained by reference to FIG. 2. FIG. 2 is a block diagram of the modem 20 coupled to a central office linecard 110. The entire arrangement is denoted generally as 100. As shown, a modem 20 is controlled by the processing system 102 which provides an individual subscriber with suitable application programs and other resources necessary to cause modem 20 to access the central office 25 via link 22. Data from the processing system 102 is transferred through the interface 104 to modem 20 where it is received in buffer 106 of the modem 20. The buffer 106 may be a universal asynchronous receiver/transmitter or other similar flow control device that handles the communications between the modem 20 and the processing system 102.

As shown, the modem 20 has an internal microcontroller 106 which receives the digital data from the processing system 102 and hands it to the converter circuit 108. In the upstream direction, the converter circuit 108 takes the digital data from the microcontroller 106 of modem 20 and converts it to analog signals which are modulated and transmitted on link 22 using appropriate modulation rules applicable to the communications protocol employed between the modem 20 and the central office linecard 110. The converter circuit 108 is often a Digital-to-Analog Converter ("DAC") or similar signal processing device.

Thus, analog signals produced by the converter circuit 108 are transmitted on link 22 where they arrive at linecard 110 in the central office 25. Similarly, analog signals are transmitted from the linecard 110 to the modem 20 where they are received by the converter circuit 108 of the modem 20 and converted to their digital equivalent. As is known by those of ordinary skill various modulation rules can be employed including Quadrature Amplitude Modulation, Trelis Code Encoding, and Frequency Shift Keying among others.

In the upstream direction, analog signals received by the linecard 110 enter the filter 112 which provides the appropriate cut-off filtering functions on the analog input. In some embodiments, the filter 112 is used to prevent aliasing of the Analog-To-Digital Converter (ADC) 114. Next, the filtered signal is converted to a digital bit stream at the ADC 114 and transferred to the backplane 150 by the control logic 116 and digital interface 119. The control logic 116 includes a Coder/decoder (Codec) 118 which provides the coupling mechanism to the digital backplane 150.

The digital backplane 150 comprises the various facilities including communications mediums (cabling, connectors, etc.) and mechanisms (routers, gateways, transceivers, etc.)

employed to provide high rate digital communications between the linecard 110 and other entities on the network. Typically, such facilities are installed, maintained and administrated by a third party administrator such as a long distance company, local exchange carrier or other similar controlling entity. The codec 118 has a digital interface 119 to the digital backplane 150.

In the downstream direction, data received from other network entities is transmitted on the digital backplane 150 and reaches the digital interface 119 where it is transferred to the Digital-to-Analog Converter (DAC) circuit 120 of the linecard 110. The control logic 116 handles the data transfer functions of the linecard 110. The DAC 120 converts the digital signals from the digital backplane 150 to their equivalent analog counterpart and transmits these analog signals to filter 122 before communicating them in the downstream direction to the modem 20 on link 22. In this manner, the modem 20 is able to transmit and receive information to and from other network entities having access to the digital backplane 150.

Figure 3:
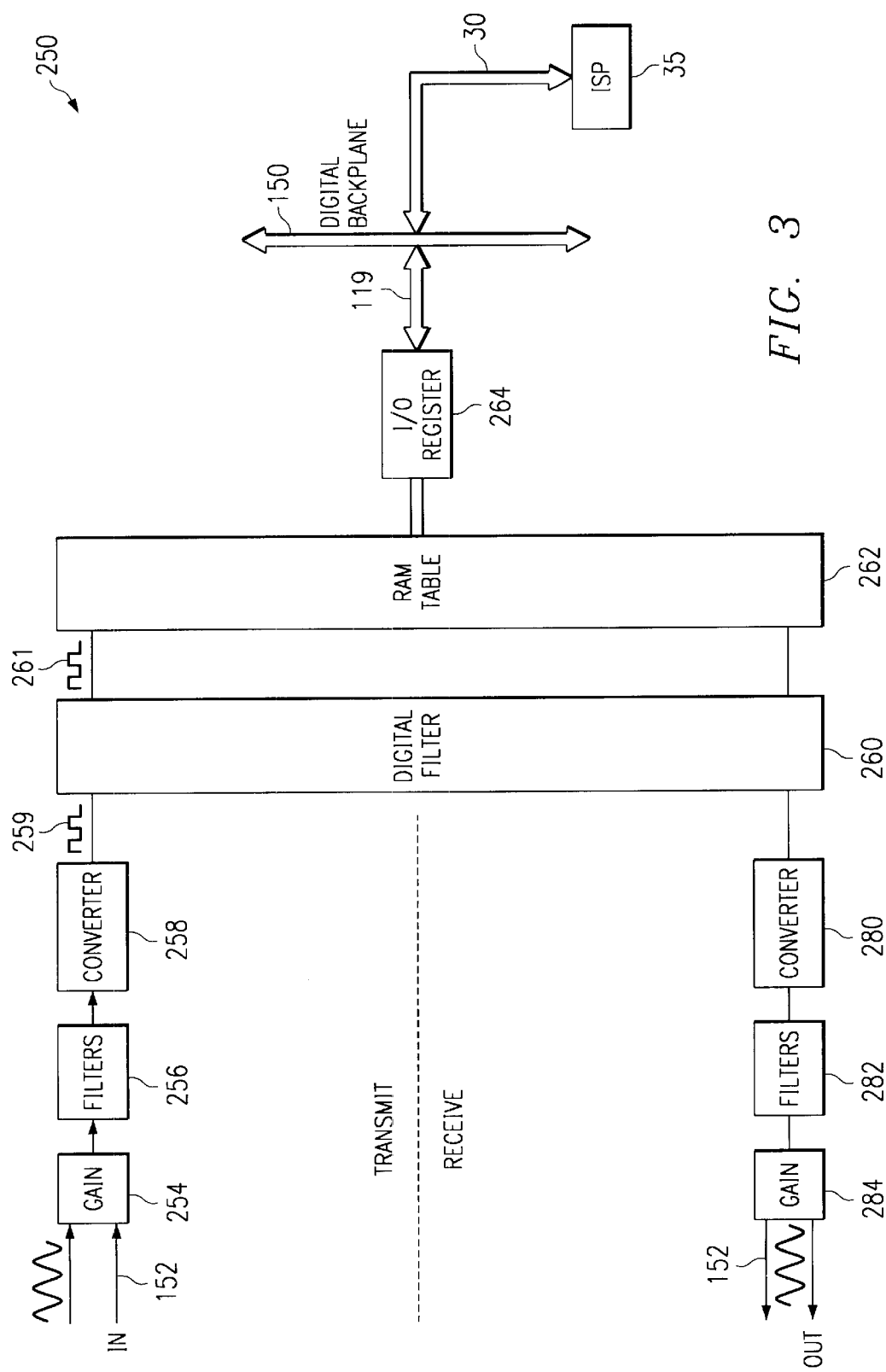
FIG. 3 is a circuit diagram for a linecard codec according to the one embodiment of the invention.

Turning to FIG. 3, a circuit diagram for a linecard codec 250 according to one embodiment of the invention is shown. As is known to those of ordinary skill, the linecard codec 250 can be used to provide a signal routing mechanism in a central office 25 between subscribers and service providers. Thus, a central office 25 can replace its existing linecard 110 with the linecard codec 250 of the present invention to overcome the limitations of companded data.

Coding and decoding functions for information transferred between subscribers and service providers are provided by the linecard codec 250. In operation, modulated analog signals enter the linecard codec 250 and reach the gain block 254 through interface 152. The interface 152 is the analog interface of the linecard codec 250. The gain block 254 helps compensate for any line losses which may occur in transmission. After appropriate amplification at the gain block 254, the analog signals are passed through filter 256 which removes extraneous signals outside the band of interest. In one embodiment, the filter 256 provides a low pass function with a cut-off frequency of approximately 3400 Hz.

The smoothed and filtered analog signal is passed through converter 258 which implements a well known analog to digital conversion function on the signal using the appropriate clock sampling rate. The output of the converter 258 is a linear digital bit stream sequence 259 which is passed to the digital filter 260 for further digital signal processing. The digital filter 260 performs a voice band shaping function and sigma-delta decimation on the incoming sequence 259. In addition, the digital filter may compensate for any lost data bits in the digital signal 259. Other processing functions may be performed by the digital filter 260 as are known to those of ordinary skill.

Next, the digital filtered signal 261 is passed to a data mapping means which transforms the linear digital bit stream sequence 258 into any other mapping scheme that best fits the desired distribution. In this manner, the limitations of uncompanded data are overcome. As shown, a Random Access Memory (RAM) table 262 may be used as the data mapping means to store a plurality of mapping values for this purpose. The fact that mapping values are stored in the RAM table 262 permits a bypass of the limitations of companded code and allows modem manufacturers to employ whatever code distribution function they find most effective for their modem protocol.

The output of the RAM table 262 reaches Input/Output ("I/O") register 264. The output from the I/O register 264 are PCM output signals which are transmitted on the digital backplane 150 through the digital interface 119. The transmission protocol and methods used to relay the PCM output signals on the digital backbone 150 are well known.

According to one embodiment, coded data is transmitted by a service provider on the digital backplane 150 which reaches the linecard codec 250 at I/O register 264. The I/O register 264 decodes the incoming data stream and passes it to the RAM table 262 which performs a mapping function based on the data values presented.

Depending on the equipment used by the service provider, and the optional mapping scheme, the service provider can transmit mapping values to the linecard codec 250 which are stored in the RAM table 262. Thus, mapping data from service providers can be stored in RAM table 262 to achieve the best distribution of bandwidth based on the companding method employed.

The digital filter 260 and converter 280 create equivalent analog signals using the modulation rules applicable to the communication protocol. The analog signals are then filtered by the filter 282 using well known means. The converted and filtered signal passes through the gain block 284 where it is amplified and massaged appropriately and transmitted to the subscriber through interface 152.

In one embodiment, the service provider downloads mapping values which are used to convert between 13-bit uncompanded data bits to 8-bit companded format.

Figure 4:
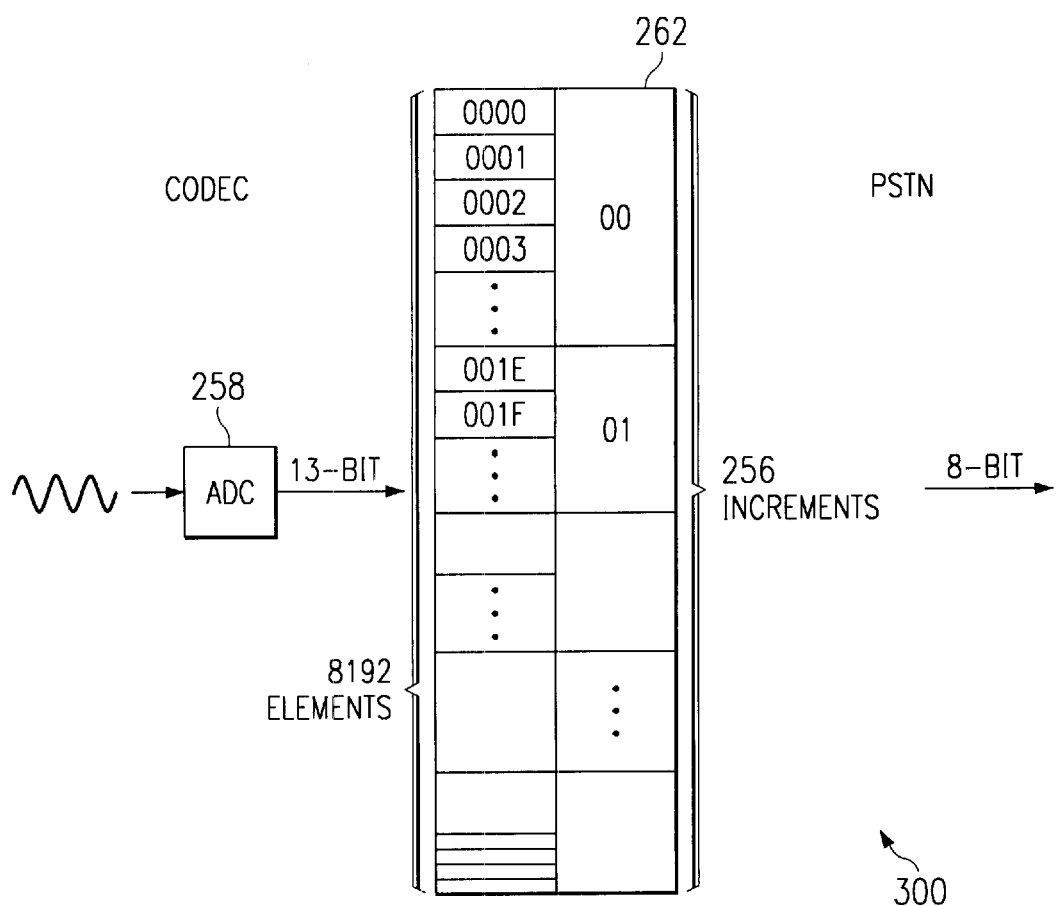
FIG. 4 is a diagram of the arrangement of the RAM table that can be used to implement the mapping function of the present invention according to one embodiment.

FIG. 4 illustrates the mapping means, denoted generally as 300, which can be employed in a codec 250 to permit a bypass of companded code. Analog signals from the subscriber enter the ADC circuit 258 inside the coded 250 where they are converted to equivalent linear 13-bit uncompanded code sequences. The 13-bit uncompanded code sequences are cross referenced against the values stored in the left hand side of the RAM table 262. Preferably, the left hand side of the RAM table 262 stores an array of mapping values corresponding to a predetermined mapping scheme. For example, in one embodiment the $\mu$-law companding algorithm is used corresponding to Northern American and Japanese standards for companding linear digital data. In another embodiment the A-law companding algorithm is used for compatibility with European network standards. Preferably, the mapping values stored in the RAM table 262 achieve the best distribution of data for the communication protocol used to communicate data on the digital backplane 150.

As shown in FIG. 4, the left hand side of the RAM table 262 comprises 8,192 elements according to one embodiment. Thus, each 13-bit linear sequence received from the ADC 258 can be cross referenced with one of the 8,192 elements stored in the left hand side of the RAM table 262. The 8,192 elements can then be mapped to a corresponding 8-bit companded value. The mapping values are grouped corresponding to a specific segment associated with a group of mapping values contained in the right hand side of the RAM table 262. Thus, the output after cross referencing is any one of 256 incremental values (represented as 8-bit companded bit sequences) in the right hand side of the table 262. These values can then be transmitted on the PSTN using known methods.

The incremental values stored in the right hand side of the RAM table 262 define the resolution of the mapping function since each of the incremental values stored in the right hand side of the RAM table 262 is associated with a group of 13-bit pattern values on the left hand side of the RAM table 262. Preferably, the incremental values on the right hand side of the RAM table 262 are obtained directly from the service provider, and are stored in the RAM table 262 to provide the most efficient distribution of data for the particular transmission protocol employed. Thus, the number of 13-bit sequences associated with any incremental value can change to effect the mapping distribution and accommodate the digital transmission channel between the service provider and the central office linecard codec. For a linear mapping scheme wherein equidistance sampling periods are desired, the values stored in the right hand side of the RAM table are sequential in order with each incremental value associated with roughly the same number of 13-bit sequences in the left hand side of the RAM table 262.

In one embodiment the incremental values in the right hand side of the RAM table 262 are those needed to define standardized companding schemes such as $\mu$-law and A-law formats. As is know to those of ordinary skill, these formats are defined by CCITT recommendation G.711 found in Volume 3 of CCITT Digital Networks, Transmission Systems and Multiplexing Equipment, recommendation G.700–G.956.

In operation, data 261 is passed to a RAM table 262 in an linear format. The mapping values from the service provider references a 13-bit code stored in the RAM table 262. The fact that mapping values are stored in the RAM table 262 permits a bypass of the limitations of 8-bit companded code and allows modem manufactures to employ whatever distribution they find most effective for their modem protocol. By bypassing the limitations of 8-bit companded code, a linecard using the codec/filter 250 permits increased bandwidth over an analog line 111 and an increased data rate from the service provider 40 to the subscriber modem 21.

According to one embodiment, the RAM table 262 is turned OFF causing the codec 250 to default to a linear mapping function for data mode operation. The output of the RAM table 262 can be directed to the I/O register 264 directly. The output from the I/O register 264 is a PCM output signal 266 which is transferred on the digital backplane 150 through interface 119. The transmission protocol and methods used to relay PCM formatted signals on the digital backbone 150 are well known.

In the downstream direction, PCM signals from the digital backplane 150 enter I/O register 264 before being passed to RAM table 262. RAM table 262 stores mapping values which convert the data from the service provider format to a linear or 13-bit uncompanded format which can be converted and transmitted to the service provider.

To transfer the mapping function to the RAM table 262, the provider modem first connects to the codec 250 preferably during "idle" time or prior to a connection as part of a negotiation sequence. The service provider can then transmit mapping values which are stored in the RAM table 262. In one embodiment, the codec 250 stores mapping values in the RAM table 262 in a 8,192×8 word order. Thus, for $\mu$-law or a-law companded codes are suitable to 13-bit codes in the RAM table 262. The uncompanded data produced by the RAM table 262 can then be routed to the digital filter 260 and D/A converter 280. The data is filtered by the filter section 282 using well known means. The converted and filtered signal passes through the gain block 284 where it is amplified and massaged appropriately and transmitted to the subscriber on T/R lines 152. In this, way the limitations of prior 8-bit companding schemes are bypassed and modem manufacturers are able to use whatever distribution they find appropriate for their modem protocol.

After the RAM table 262 has been filled, the codec 250 starts using the new mapping function enabled by the values stored in the RAM table 262. The provider modem may transmit a signal to the subscriber modem 21 indicating that an increased data throughput connection has been achieved and will continue the connection using the increased connection rate.

Since companded code is a poor carrier for data signals, the data values stored in RAM table 262 allow individual manufactures to determine the best mapping scheme for particular communications protocol. For example, according to one embodiment the modem at the provider stores a linear coding scheme in the RAM table 262. The linear coding scheme could be downloaded to the codec 250 and stored in the RAM table 262 at the beginning of the connection.

While the invention has been described in conjunction with preferred embodiments, it should be understood that modifications will become apparent to those of ordinary skill in the art and that such modifications are intended to be included within the scope of the invention and the following claims.

What is claimed is:

1. A device for communicating data over a Public Switched Telephone Network (PSTN) linking a plurality of subscribers and services providers through a central office facility, the PSTN containing at least one digital backplane, the device comprising:

an analog interface to the PSTN;

a converter coupled to the analog interface and configured to convert analog signals from subscribers to digital linear coded data;

a mapping means coupled to the converter and arranged to transform the linear coded data to coded data using a predetermined mapping scheme; and a digital interface to the digital backplane, said digital interface arranged to transmit said coded data to the service providers.

2. The device according to claim 1 wherein said mapping means includes a programmable memory space.

3. The device according to claim 2 wherein said programmable memory space is a Random Access Memory ("RAM") table.

4. The device according to claim 3 wherein said RAM table is configured to store said predetermined mapping scheme.

5. The device according to claim 4 wherein said predetermined mapping scheme is stored in said RAM table as mapping values corresponding to the a-law companding scheme.

6. The device according to claim 4 wherein said predetermined mapping scheme is stored in said RAM table as mapping values corresponding to the $\mu$-law companding scheme.

7. The device according to claim 4 said RAM table stores values in a 8,192×8 word order.

8. The device according to claim 1 wherein said converter is an Analog-to-Digital converter with an output terminal that drives said mapping means.

9. The device according to claim 1 wherein said predetermined mapping scheme is linear.

10. A communications network comprising:

a subscriber having an analog interface to a Public Switched Telephone Network (PSTN), the subscriber capable of generating analog signal waveforms for transmission on said PSTN via said analog interface;

a Central Office (CO);

a PSTN link forming a communications channel between said CO and said subscriber;

a service provider;

a digital backplane forming a communications channel between said service provider and said CO; and wherein said CO further includes a linecard codec configured to receive said analog signal waveforms, convert said analog signal waveforms to equivalent digital bit stream sequences, and transmit said sequences on said digital backplane, the transmission rate of said sequences on said digital backplane proportional to a predetermined mapping function provided by said linecard codec.

11. The communications network according to claim 10 wherein said predetermined companded mapping function is implemented using a memory space that stores a plurality of coding values.

12. The communications network according to claim 11 wherein said memory space is a Random Access Memory (RAM) table.

13. The communications network according to claim 12 wherein said RAM table is arranged in a 8,192×8 word order.

14. The communications network according to claim 12 wherein said RAM table is filled with values corresponding to a linear coding scheme.

15. The communications network according to claim 10 wherein said predetermined companded mapping function converts linear coded digital data to companded digital data sequences.

16. The communications network according to claim 10 wherein said predetermined companded mapping function converts 8-bit companded data from the digital backplane to 13-bit linear data suitable for transmission to said subscriber.

17. A method of overcoming the limitations of companded data transmitted over a public switched telephone network, the network containing an analog connection to a central office and a digital backplane from the central office to a service provider, the method comprising the steps of:

transmitting analog signals over the analog connection;

converting the analog signals to equivalent linear digital data;

mapping said linear coded digital data to coded data using a mapping scheme that relates to communications protocol employed by the service provider; and transmitting said coded data on the digital backplane.

18. The method according to claim 17 wherein the step of mapping said linear digital data to coded data includes the step of using a linear mapping scheme.

19. The method according to claim 17 wherein the step of mapping said linear digital data to a coded data includes the step of using a $\mu$-law mapping scheme.

20. The method according to claim 17 wherein the step of mapping said linear digital data to a coded data includes the step of using an A-law mapping scheme.

21. The method according to claim 17 wherein the step of transmitting analog signals over the analog connection is preceded by the step of transmitting a predetermined mapping scheme to the central office.

22. The method according to claim 21 wherein said predetermined mapping scheme is stored in a programmable memory space.

23. The method according to claim 17 further comprising the step of transmitting said coded data as PCM data.

24. The method according to claim 17 further comprising the steps of:

transmitting coded data from the service provider to the central office over the digital backplane;

mapping the coded data to equivalent linear data;

converting the linear data to modulated analog signals; and transmitting the analog signals over the analog connection.

* * * * *